(12) United States Patent
Young

(10) Patent No.: US 7,219,966 B2
(45) Date of Patent: May 22, 2007

(54) BRAKE PEDAL FEEL SIMULATOR

(75) Inventor: Kent Randolph Young, Waterford, MI (US)

(73) Assignee: Continental Teves, Inc., Auburn Hills, MI (US)

( * ) Notice: Subject to any disclaimer, the term of this patent is extended or adjusted under 35 U.S.C. 154(b) by 9 days.

(21) Appl. No.: 10/958,021

(22) Filed: Oct. 4, 2004

(65) Prior Publication Data
US 2006/0071544 A1 Apr. 6, 2006

(51) Int. Cl.
B60T 8/34 (2006.01)

(52) U.S. Cl. ............... 303/113.4; 303/122; 303/122.11

(58) Field of Classification Search ............ 303/113.4, 303/15, 115.1, 22.4, 115.2, 122, 122.03, 122.04, 303/122.05, 122.11, 116.1, 116.2, 119.1, 303/119.2, 119.3; 60/568, 570
See application file for complete search history.

(56) References Cited

U.S. PATENT DOCUMENTS

| 3,633,366 | A | | 1/1972 | Cripe |
| 3,719,123 | A | | 3/1973 | Cripe |
| 4,334,713 | A | * | 6/1982 | Dauvergne .................... 303/54 |
| 5,326,158 | A | * | 7/1994 | Ohori et al. .................... 303/3 |
| 5,941,608 | A | * | 8/1999 | Campau et al. .......... 303/113.4 |
| 6,309,032 | B1 | | 10/2001 | Kusano et al. |
| 6,347,518 | B1 | * | 2/2002 | Kingston et al. ............. 60/555 |
| 6,672,685 | B2 | * | 1/2004 | Ishimura et al. ......... 303/113.4 |
| 7,003,954 | B2 | * | 2/2006 | Ogiwara et al. .............. 60/568 |
| 2002/0108463 | A1 | | 8/2002 | Shaw et al. |
| 2005/0023891 | A1 | * | 2/2005 | Terazawa et al. ........ 303/114.1 |

* cited by examiner

Primary Examiner—Pam Rodriguez

(57) ABSTRACT

A brake pedal feel simulator is provided which eliminates the simulation force during emergency, non-assisted and failure conditions. The brake pedal feel simulator generally comprises a spring, a spring seat and a spring stop. The spring is operatively connected to the brake pedal for providing the simulation force, while the spring seat receives an end of the spring. A spring stop is operable between an extended position and a retracted position to prevent and permit rearward axial translation of the spring seat. By permitting rearward axial translation of the spring seat, a simulation force provided by the spring is removed so that there is essentially no resistance to translation of the brake pedal, thereby improving the operator's ability to brake the vehicle.

17 Claims, 4 Drawing Sheets

BRAKE PEDAL FEEL SIMULATOR

FIELD OF THE INVENTION

The present invention relates generally to brake pedal feel simulators for providing a simulation braking force to a brake pedal, and more particularly relates to operation of such a brake pedal feel simulator during failed or emergency braking conditions.

BACKGROUND OF THE INVENTION

Electrical brake systems, generally referred to as "brake by wire" systems, are increasingly being integrated into or replacing conventional hydraulic brake systems. Such electrical brake systems are preferable because they reduce the mass of the system and provide greater ability to integrate the system into the vehicle's other electronic circuits and controls.

During depression of the brake pedal in a conventional hydraulic braking system, the hydraulic fluid will exert a force back on the brake pedal due to the hydraulic pressure in the brake lines. Since an electronic brake system may not have such hydraulic pressure at the brake pedal, the vehicle operator will not detect any countering force, which in turn can disorient the operator. Accordingly, a typical electrical brake system will include a brake pedal feel simulator to provide a simulation force on the brake pedal. The simulation force provided by the simulator acts opposite the brake pedal force generated by the vehicle operator.

The Applicants have discovered a drawback to such brake pedal feel simulators. During emergency conditions or failure conditions, the brake pedal feel simulator continues to oppose the depression of the brake pedal by the operator and hence reduces the amount of force transmitted through the brake pedal. As used herein, emergency conditions are defined as situations where a large amount of braking force is required in a short period of time, and generally includes brake pedal forces greater than 200 N. As used herein, failure conditions are defined as a power failure or the failure of brake boosters to supplement the braking force, which also generally include high brake pedal forces greater 200 N. Thus, the simulator opposes the operation at times when high brake forces are needed.

Accordingly, there exists a need to provide a brake pedal feel simulator which automatically adjusts its operation to reduce or eliminate the simulation force during emergency or failure conditions.

BRIEF SUMMARY OF THE INVENTION

The present invention provides a brake pedal feel simulator which eliminates the simulation force during emergency, non-assisted and failure conditions. The brake pedal feel simulator generally comprises a spring, a spring seat and a spring stop. The spring is operatively connected to the brake pedal for providing the simulation force, while the spring seat receives an end of the spring. A spring stop is operable between an extended position and a retracted position. The extended position is denoted by the springs stop being located to engage the spring seat and substantially prevent rearward axial translation of the spring seat. The retracted position is denoted by the spring stop being located to disengage the spring seat and permit rearward axial translation of the spring seat. By permitting rearward axial translation of the spring seat, a simulation force provided by the spring is removed so that there is essentially no resistance to translation of the brake pedal, thereby improving the operator's ability to brake the vehicle.

According to more detailed aspects, the spring stop comprises one or more wedge member riding on one or more ramp member. In this way, the wedge member moves radially outwardly as the wedge member moves axially rearwardly The spring stop is biased to the extended position, and preferably the wedge member is biased axially forward and/or radially inward. The biasing force on the spring stop is preferably set to correspond to a predetermined brake pedal force. The spring stop transitions to the retracted position when the predetermined force is reached. Most preferably the predetermined brake pedal force is greater than 200 N and less than 500 N.

Another embodiment of the brake pedal feel simulator generally comprises a housing defined in an axial passageway and a spring positioned inside the passageway. The spring is operatively connected to the brake pedal for providing the simulation force. A spring seat is positioned in the passageway and receives an end of the spring. A spring stop is translatable in the radial direction, and is biased radially inwardly into the passageway to engage the spring seat under normal operating conditions to substantially prevent rearward axial translation of the spring seat. A predetermined brake pedal force translates the spring stop radially to disengage the spring seat and permit rearward axial translation of the spring seat. In this manner, the simulation force is removed and no longer opposes the brake pedal force applied by the vehicle operator.

According to more detailed aspects, the spring stop comprises a wedge and a ramp along which the wedge rides for radial translation. A second spring may be used to bias the wedge radially inwardly, and preferably comprises an elastomeric band extending around the wedge. Alternatively, a solenoid may bias the wedge either axially forwardly or radially inwardly. In yet another embodiment, the ramp may be formed in the spring seat.

BRIEF DESCRIPTION OF THE DRAWINGS

The accompanying drawings incorporated in and forming a part of the specification illustrate several aspects of the present invention, and together with the description serve to explain the principles of the invention. In the drawings.

DETAILED DESCRIPTION OF THE INVENTION

Figure 1:
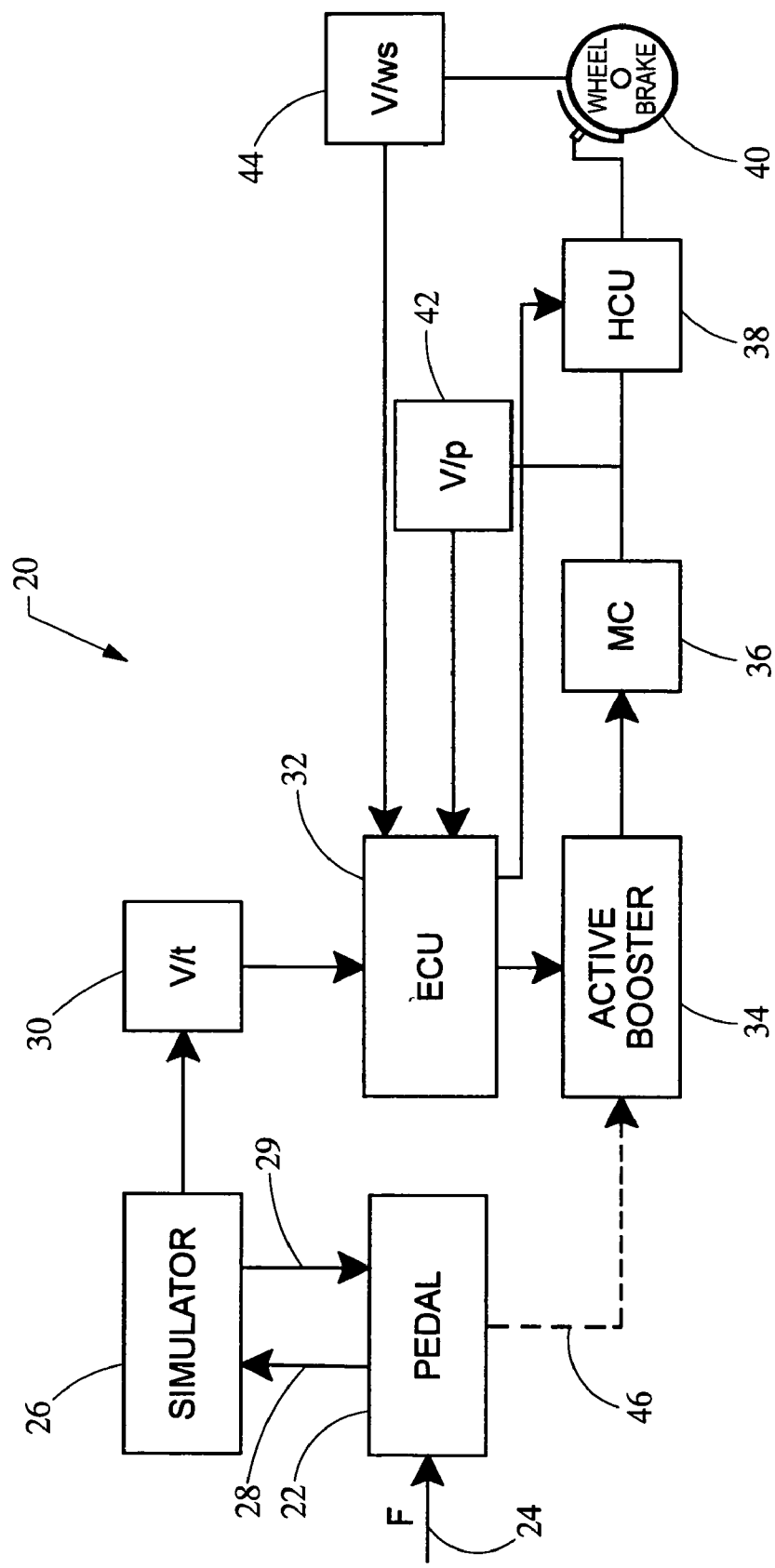
FIG. 1 is a schematic depiction of an electronic brake system having a simulator constructed in accordance with the teachings of the present invention.

Turning now to the figures, FIG. 1 schematically depicts an electronic braking system 20 having a simulator 26 constructed in accordance with the teaching of the present invention. The braking system 20 generally includes a brake pedal 22 receiving an input force denoted by arrow 24 from the operator of the vehicle. The operator force 24 is transmitted through the pedal 22 to the brake pedal feel simulator 26 which also transmits a simulation force 29 back to the brake pedal 22. A displacement sensor 30 is used to monitor pedal travel and transmits a corresponding signal to an electronic control unit 32 which represents the central control of the braking system 20. The electronic control unit 32 sends a control signal to an active booster 34, which in turn is mechanically linked to a master cylinder 36. The master cylinder 36 is hydraulically connected to the wheel brake 40 through a hydraulic control unit 38 and booster 34 which together regulate the braking force at the wheel brake 40. The hydraulic control unit 38 receives a control signal from the electronic control unit 32 which regulates this operation. A pressure sensor 42 is used to detect the hydraulic pressure in the brake line and provides a signal back to the electronic control unit 32. Similarly, a speed sensor 44 is used to detect wheel speed and provide this information to the electronic control unit 32 for control purposes.

It can be seen in FIG. 1 that the brake pedal 22 is mechanically disconnected from the booster 34 and master cylinder 36 during normal operation. However, as indicated by the dashed line 46, during a failure condition, the mechanical connection between the brake pedal 22 and booster 34 is restored in the unlikely event the electronic control unit 32 is unable to effectuate a braking force at the wheel brake 40. Thus, the braking system 20 is a hybrid between a pure "brake by wire" and a conventional hydraulic brake system.

In previous simulators, the simulator provides a steadily increasing simulation force as the pedal travel increases. This has been depicted in the graph of FIG. 2 which shows the simulation force (at the pedal) on the X-axis 50 and the pedal travel on the Y-axis 52. It will be recognized that the simulation force is directly related to the pedal force, as the simulation force must be overcome by operator to move the brake pedal. The spring rate of the simulator 26, affects the relationship between pedal travel and force as represented by the line 54 in the graph. Arrowed line 56 represents the range of typical simulation and thus pedal force levels during normal braking conditions, while arrowed line 58 represents a range of pedal force that is generally only achieved during emergency conditions, non-assisted conditions or failure conditions. The first range 56 can be loosely defined as forces between 0 and 200 N, while range 58 can be generally considered 200 N and greater.

In the typical simulator, the spring rate (defined as the ratio of force to travel), determines the slope of line 54, and a single spring typically provides a constant spring rate, e.g. line 54 would follow a straight line represented by line 54a and dash line 60. To the extent that a variable rate spring is used, line 54 would curve downwardly to represent an increasing spring rate since increasing force would be required to effectuate pedal travel. According to the present invention, however, upon reaching a predetermined force 64, the simulation force drops to at or near zero as indicated by segment 54B of line 54. Preferably, this predetermined force 64 is set in the extended range 58 generally only achieved during emergency, non-assisted, or failed conditions. Accordingly, it can be seen that the present invention essentially eliminates the simulation force, and gains an additional force margin represented by area 62 on the graph of FIG. 2. In this way, the resistance to the operator's force 24 is reduced and/or eliminated to permit more braking force to be applied at the wheel brake 40.

Figure 3:
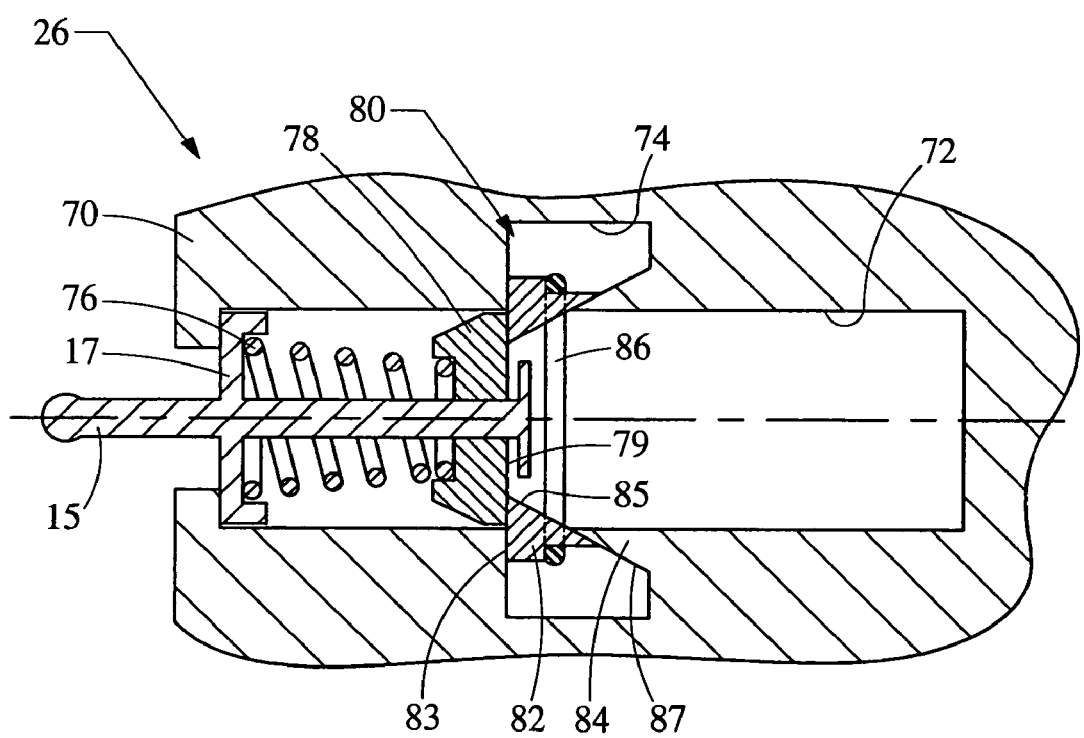
FIG. 3 is a cross-sectional view of the simulator of FIG. 1.

FIG. 3 depicts a cross-sectional view of the simulator 26. The operator force 24 through the brake pedal 22 is supplied to the simulator 26 by way of an input rod 15, which has been depicted as a T-rod 15 having a spring seat 17 formed therein. The T-rod 15 permits return of the spring 76 to its normal position. The simulator 26 generally includes a housing 70 defining an axial passageway 72 extending therethrough. A recessed area 74 is provided radially outside of the passageway 72 for receiving a spring stop 80, as will be described in more detail herein.

The simulator 26 further includes a spring 76 which is positioned between seat 17 and a separate spring seat 78. Spring seat 78 includes a rearwardly facing axial surface 79 which is designed to press against and engage the spring stop 80. The spring stop 80 generally comprises one or more wedges 82 having an axially forwardly facing surface 83 for engaging the spring seat 78 and its axial surface 79. A sloped surface 85 of the wedge 82 is designed to correspond with the sloped surface 87 of a ramp 84 connected to the housing 70. Accordingly, it will be seen that as the wedge 82 slides axially rearwardly along the ramp 84, the wedge 82 will move radially outwardly into the recess 74. As second spring 86, and preferably an elastomer band 86, is utilized to circumscribe all of the wedges 82, and therefore provide a radially inward bias thereto. In this manner, the spring stop 80 is biased to an extended position as shown in FIG. 3. This extended position causes engagement between the spring stop 80 and the spring seat 78.

As the brake pedal 22 is depressed, the input rod 15 and spring seat 78 move axially rearwardly and press axially against the wedges 82 of the spring stop 80. As the wedges begin to move axially rearwardly, the wedges 82 also move radially outwardly to a retracted position where the passageway 72 Is clear for receiving further axial movement of the spring seat 78. This effectively removes the simulation force 29 provided by the spring 76 of the simulator 26. Since the spring seat 78 and wedges 82 move slightly axially as the spring stop 80 moves between its extended and refracted positions, the spring stop 80 is said to substantially prevent rearward axial translation of the spring seat 78.

Figure 2:
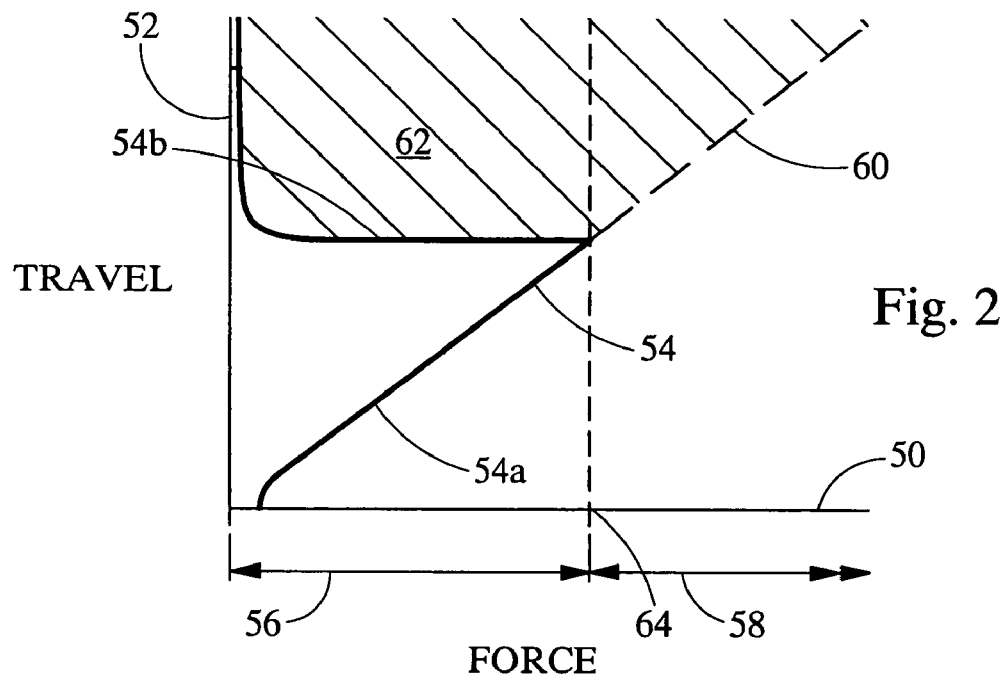
FIG. 2 is a graph depicting the pedal travel versus brake pedal force as affected by the simulator of FIG. 1.

Furthermore, it will also be seen that the elastomer band 86 is selected to provide the predetermined force level 64 at which the wedges 82 have moved sufficiently radially outwardly into the extended position of the spring stop 80 to permit further rearward axial translation of the spring seat 78. In this manner, the simulation force 29 is effectively removed beyond the pedal force level reaching or exceeding the predetermined force level 64, and the additional force margin 62 is gained as depicted in FIG. 2. Those skilled in the art will readily understand that numerous other biasing means could replace the elastomer band 86, and could act either radially or axially on the wedges 82.

Figure 4:
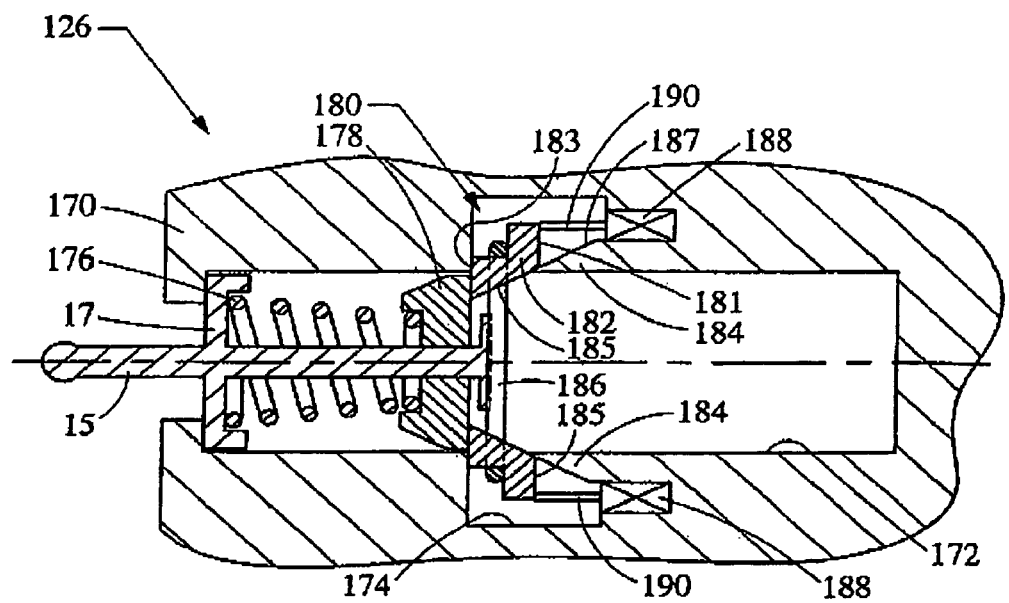
FIG. 4 depicts a cross-sectional view of an alternate embodiment of the simulator depicted in FIGS. 1 and 3.

Turning to FIG. 4, an alternative embodiment of the simulator has been depicted as reference number 126. The primary difference in the embodiment of FIG. 4 is that the bias provided to the spring stop 80 is now provided by one or more solenoids 188, in contrast to the elastomer band 86 which previously provided the biasing force. The elastomer band 186 of this embodiment extends around the wedges 182 to provide a return force to translate the wedges radially inwardly. Similar to the prior embodiments, the housing 170 defines an axial passageway 172 having a recessed portion 174 for receiving the spring stop 180. The spring 176 is positioned between the seat 17 formed in the input rod 15 and the spring 178 positioned inside the passageway 172. The spring seat 178 presses against the wedge 182 of the spring stop 180, and particularly the axially forwardly facing surface 183. It can be seen that the wedge 182 is designed somewhat differently, and includes an axially rearwardly facing surface 181 for engagement with the armature 190 of the solenoid 188. The wedge 182 defines a slope surface 185 which rides along the slope surface 187 of a ramp 184 formed in the housing 170. As in the prior embodiment, the wedge or wedges 182 move radially outwardly as they are forced axially rearwardly. The solenoid 188 is provided to resist this rearward and outward movement, and bias the spring stop 160 into extended position. Upon detection of an emergency braking or non-assisted condition, or in the event of a failure condition such as a power failure, the solenoid 188 will be turned off or will be automatically turned off due to failure to receive power. At that time, and at a force level F, the wedges 182 are free to move radially outwardly and the spring stop 180 will take the retracted position allowing the spring seat 178 to move axially rearwardly further into the passageway 172. This essentially removes the simulation force provided by the spring 176 of the simulator 126.

Figure 5:
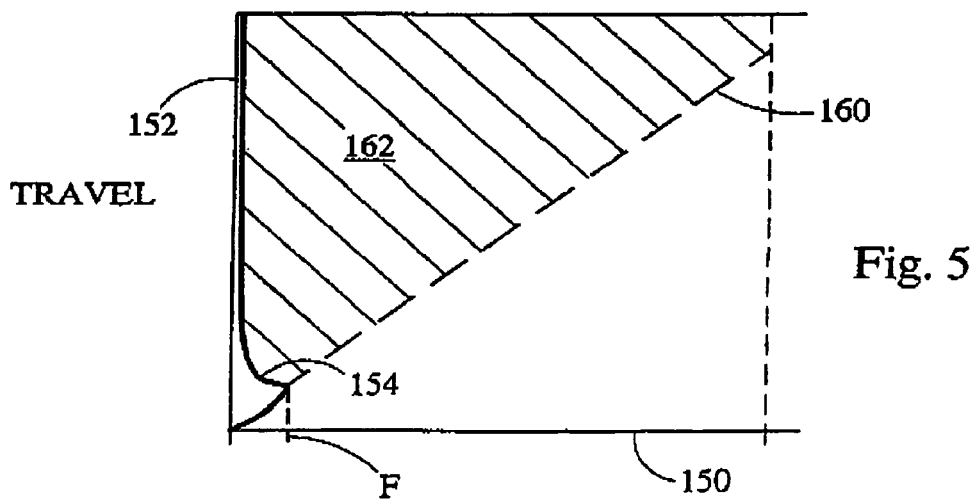
FIG. 5 is a graph similar to FIG. 2 but showing data for the alternate embodiment depicted in FIG. 4.

A graphical depiction of the simulator 126 depicted in FIG. 4 has been shown in FIG. 5. This graphical depiction is similar to the graph of FIG. 2, having the force on X-axis 150 and the travel of the Y-axis 152, while the line 154 represents the simulation force. The line 160 represents the simulation force if the spring 176 not been effectively removed, and thus the hatched area 162 represents the force gained due to removal of the simulation force.

Figure 6:
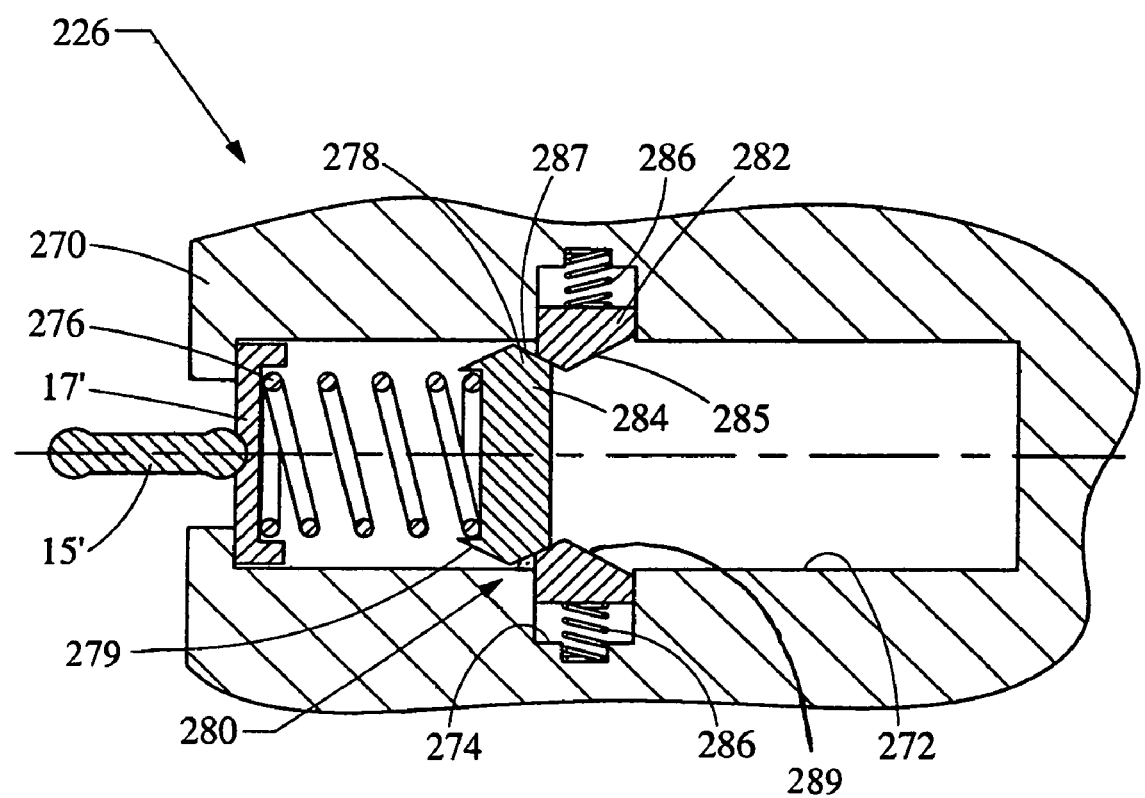
FIG. 6 is a cross-sectional view of yet another embodiment of the simulator depicted in FIGS. 1 and 3.

Yet another embodiment of a brake pedal feel simulator 226 has been depicted in the cross-sectional view of FIG. 6. In this embodiment, the input rod 15' has been shown as an individual rod connected to a separate spring seat 17'. The spring 276 extends between the seat 17' and the spring seat 278 to provide the simulation force back to the brake pedal 22. The housing 270 defines an axial passageway 272 having a recess 274 for receiving the spring stop 280. In this embodiment, the spring seat 278 itself has been used to define the ramp 284 having a sloped surface 287. Thus, the wedge 282 need only be biased radially inward by a spring 286 which is positioned within the recess 274. The wedge has a leading angled surface 285 for corresponding to the surface 287 of the ramp 284. Upon a sufficient pedal force is determined by the biasing force of the spring 286, the spring seat 278 will disengage the spring stop 280 and be allowed to pass further rearwardly into the axial passage 272, thus removing the simulation force provided by the spring 276.

It can also be seen that the spring seat 278 includes a forwardly facing sloped surface 279, which corresponds with a rearwardly facing sloped surface 289 on the wedge 282. These sloped surfaces 279, 289 are provided so that the spring seat 278 may return forwardly past the wedges 282 of the spring stop 280. This may be accomplished by manual force on the brake pedal or may be assisted by external means, including by providing brake pressure to a structure mechanically connected to the spring seat 278 or input rod 15'.

Accordingly, it will be recognized by those skilled in the art that the simulator of the present invention provides a reduction in simulation force during high brake force levels which are generally selected to represent emergency, non-assisted and failed conditions which require very high brake pedal forces. This results in a force margin which is gained automatically without requiring any special switch or special devices, although such mechanisms could be readily employed in conjunction with the present invention.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

The invention claimed is:

1. A brake pedal feel simulator for a vehicle braking system having a brake pedal, the simulator providing a simulation force to the brake pedal, the simulator comprising:
   a spring operatively connected to the brake pedal for providing the simulation force;
   a spring seat receiving an end of the spring;
   a spring stop operable between an extended position and a retracted positions, the spring stop including one or more wedge member riding on one or more ramp member, the wedge member moving radially outwardly as the wedge member moves axially rearwardly;
   the extended position denoted by the spring stop being located to engage the spring seat and substantially prevent rearward axial translation of the spring seat and provide the simulation force through the spring; and
   the retracted position denoted by the spring stop being located to disengage the spring seat and permit rearward axial translation of the spring seat.

2. The simulator of claim 1, wherein the wedge member is positioned to engage the spring seat in the extended position and disengage the spring seat in the retracted position.

3. The simulator of claim 1, wherein the wedge member is biased axially forward and/or radially inward.

4. The simulator of claim 1, wherein the spring stop is biased to the extended position.

5. The simulator of claim 4, wherein the biasing force on the spring stop is set to correspond to a predetermined brake pedal force, the spring stop transitioning from the extended position to the retracted position when the predetermined force is reached.

6. The simulator of claim 5, wherein the predetermined brake pedal force is greater than 200 N and less than 500 N.

7. The simulator of claim 5, wherein the predetermined brake pedal force is less than an average brake pedal force during an emergency braking situation or a non-assisted braking situation or a failed power situation.

8. A brake pedal feel simulator for a vehicle braking system having a brake pedal, the simulator providing a simulation force to the brake pedal, the simulator comprising:
   a housing defining an axial passageway;
   a spring positioned inside the passageway and operatively connected to the brake pedal for providing the simulation force;
   a spring seat positioned in the passageway and receiving an end of the spring; and
   a spring stop translatable in the radial direction, the spring stop biased radially inwardly into the passageway to engage the spring seat under normal operating conditions to substantially prevent rearward axial translation of the spring seat.

9. The simulator of claim 8, wherein a predetermined brake pedal force translates the spring stop radially to disengage the spring seat and permit rearward axial translation of the spring seat.

10. The simulator of claim 8, wherein the spring stop comprises a wedge and a ramp along which the wedge rides for radial translation of the wedge.

11. The simulator of claim 10, wherein the spring stop comprises a plurality of wedges and ramps, and wherein a second spring biases the wedges radially inwardly.

12. The simulator of claim 11, wherein the second spring is an elastomeric band extending around the plurality of wedges.

13. The simulator of claim 10, further comprising a solenoid biasing the wedge.

14. The simulator of claim 13, wherein the solenoid biases the wedge axially forwardly.

15. The simulator of claim 10, further comprising a plurality of wedges and ramps, and a plurality of solenoids biasing the wedges, and further comprising an elastomeric band extending around the wedges providing a return force to translate the plurality of wedges radially inwardly.

16. The simulator of claim 10, wherein the ramp is formed in the spring seat.

17. The simulator of claim 10, wherein the housing defines a recess sized to receive the wedge.

* * * * *